United States Patent [19]

Ward

[11] 4,315,501

[45] Feb. 16, 1982

[54] SOLAR HOT WATER UNIT AND SYSTEM

[76] Inventor: Raymond L. Ward, 2 Monadnock Rd., Worcester, Mass. 01609

[21] Appl. No.: 148,405

[22] Filed: May 9, 1980

[51] Int. Cl.³ ............................................. F24J 3/02
[52] U.S. Cl. .................................. 126/449; 126/450; 126/448
[58] Field of Search ............... 126/442, 443, 448, 449, 126/450, 445

[56] References Cited

U.S. PATENT DOCUMENTS 3,976,508  8/1976  Mlavsky .............................. 126/443
4,186,721  2/1980  Whitman .............................. 126/449

Primary Examiner—James C. Yeung
Attorney, Agent, or Firm—Frank A. Steinhilper

[57] ABSTRACT

A solar hot water heating system includes a plurality of pipe assemblies, each having an outer pressure-sustaining tube and an inner perforated spiral tubing positioned at the roof of a building for which hot water is supplied. End seals close off the ends of the assemblies and support the inner tubing within the outer tubing. Water mixing and prevention of hot spots is accomplished passively by passing water through the spiral inner tubing. An economically favorable system is achieved.

4 Claims, 10 Drawing Figures

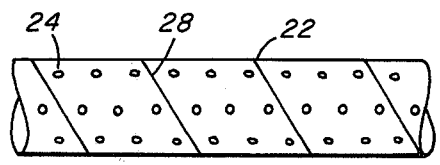
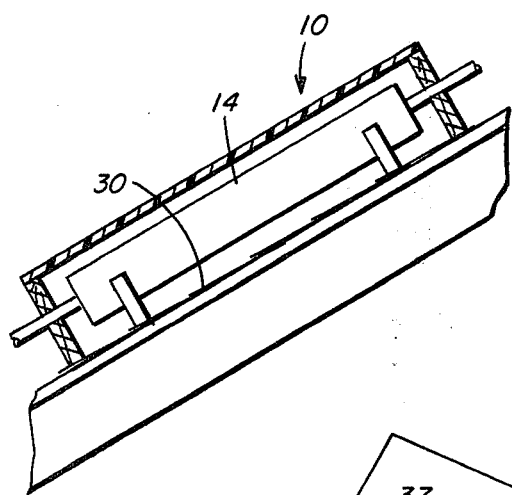
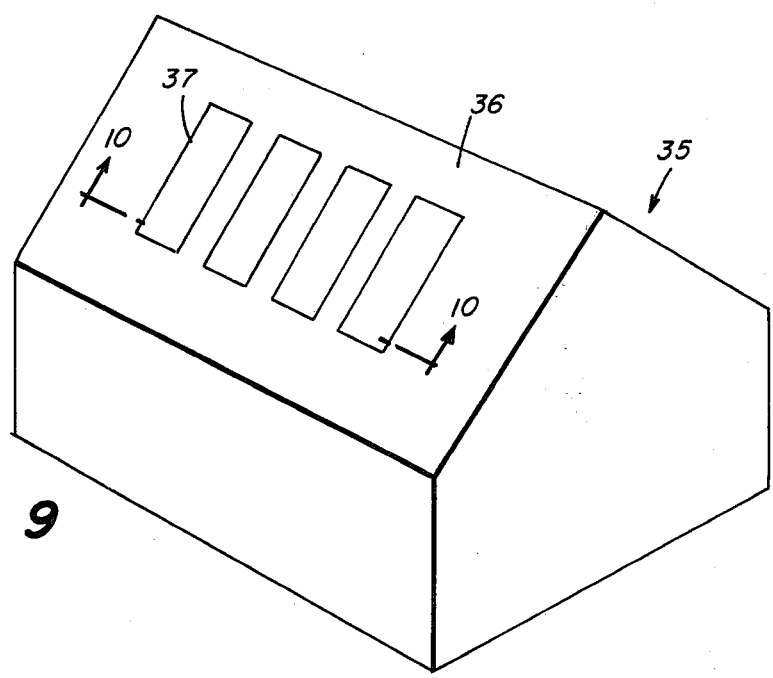
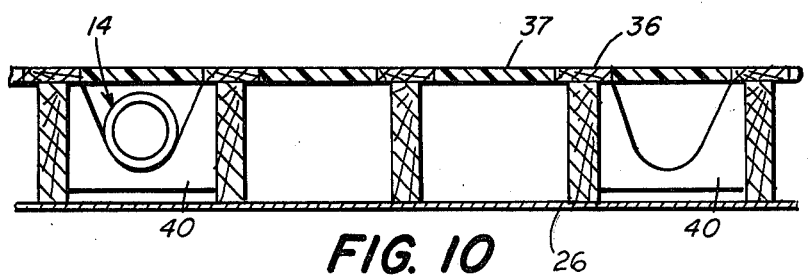

SOLAR HOT WATER UNIT AND SYSTEM

BACKGROUND OF THE INVENTION

In recent years it has become economically favorable to consider solar energy for heating systems, particularly for heating domestic or industrial hot water. Various types of systems are proposed or used, some of which heat the water directly and some heat an intermediate fluid which in turn is circulated to heat the water supply. The present invention is a direct heating system. Of the direct heating types there are also a wide variety of systems. Broad area panels are used, panels with numerous small pipes or other water carriers, panels with pipes affixed to radiation absorbers in heat conductive relationship, and many other types and kinds.

The various solar heating systems almost seem to have a single common characteristic. Because of escalating energy costs they seek to save money by substituting cost-free energy of the sun for expensive energy from fossil fuels; and to make efficient use of this free energy they are designed and constructed in sophisticated and expensive ways, and tossing away their advantages and the reasons for using solar heat. The present invention, on the contrary, is deeply concerned with manufacturing cost and installation cost, using simple, basic components which are readily available and as inexpensive as possible, thus conforming with the fact of cost-free sunlight.

GENERAL NATURE OF THE INVENTION

The present invention employs a generally insulated frame installed preferably directly on the roof of the home or other building for which hot water is supplied. A plurality of pipes or tubing within the frame are supported by a cradle or other support means, and the tubing is connected to the water system of the building. Each of the pipes is relatively large, for example a number of feet long and around three or four up to about twelve inches in diameter, and includes an outer pressure resistant pipe or tubing with an inner perforated spiral tubing. A cover panel, such as a transparent or translucent fiberglass panel is secured to the frame, and largely insulating the unit.

The unit is installed preferably on the roof of the building and desirably directly on a black or other dark roof, such as a black shingle or other roofing material. If desired, the unit may be connected to a storage member, but generally the system will feed directly to the water usage system and will feed directly from the water supply.

According to this invention, the system avoids the need for expensive controls, sensors, pumps and radiation absorbers. In addition, it employs simple plumbing and water supply elements of inexpensive and practical nature and design. Present indications are that the system of the present invention can be manufactured and installed for less than half the cost of usual solar hot water heating systems.

The general nature of the invention having been set forth, the invention is more fully illustrated in the drawings in which:

FIG. 6 is a schematic view of the unit of FIG. 1 installed on the roof of a house or other building;

FIG. 8 is a perspective view of an inner tubing of the units shown in FIGS. 1 to 7;

FIG. 9 is a schematic view of a house having a solar heating unit according to another embodiment of the invention; and FIG. 10 is a front cross section of the unit shown in FIG. 9.

SPECIFIC DESCRIPTION OF THE INVENTION

Figure 1:
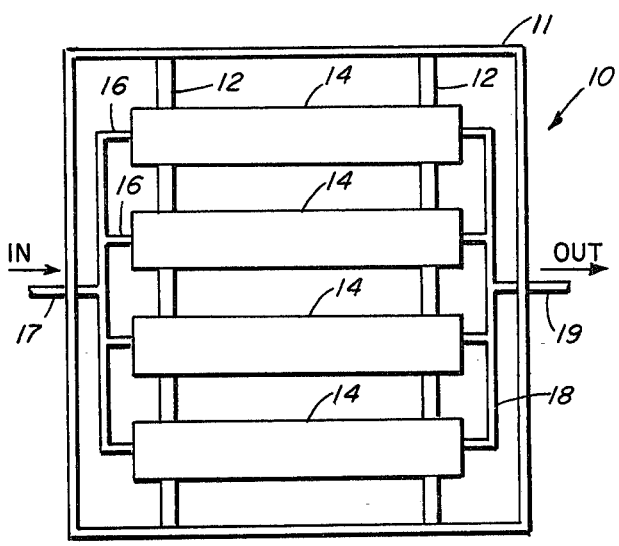
FIG. 1 is a top view of a solar heating unit according to one embodiment of the invention.
Figure 3:
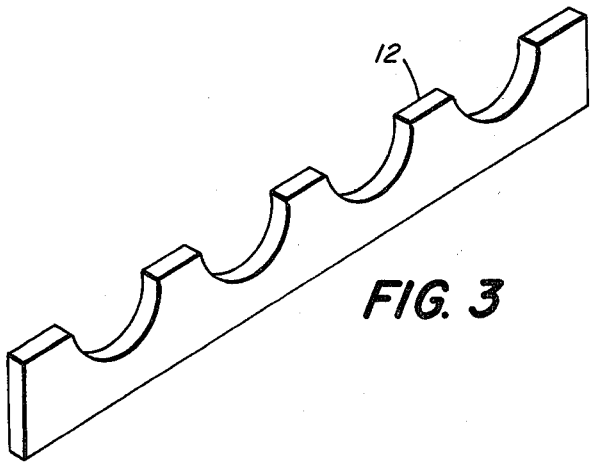
FIG. 3 is a perspective view of a support member of the unit shown in FIG. 1.

In FIG. 1 is illustrated a solar heating unit generally designated 10, having a frame 11 suitable for installation in a sunny location such as, for example, on the roof of a house or other building. Positioned within the frame are support members or cradles 12 (shown also in FIG. 3) being adapted to hold a plurality of pipe assemblies or tubing 14. As illustrated, the pipe assemblies may be several feet long and the unit contains sufficient assemblies to supply the hot water for the house. There may, for example, be four pipe assemblies 14, each about six or seven feet long and about six inches in diameter. At the input end, the several pipe assemblies 14 are fed by individual input tubes 16 joined to a single input line 17. At the output end, the several pipe assemblies 14 feed to individual output tubes 18 joined to a single output line 19.

Figure 2:
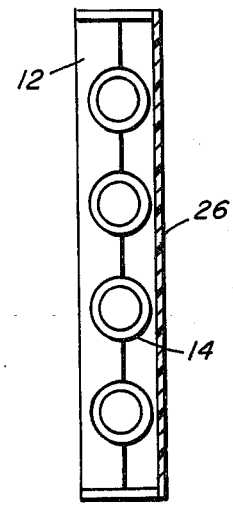
FIG. 2 is an end cross sectional view of the unit shown in FIG. 1.
Figure 4:
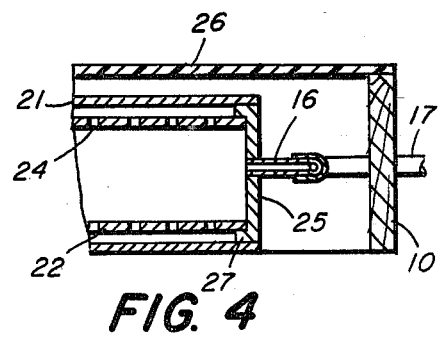
FIG. 4 is a partial cross section view of a tubing end within the unit of FIG. 1.

As further shown in FIGS. 2 and 4, each of pipe assemblies 14 comprises an outer relatively large diameter tube 21, such as copper or stainless steel pipe capable of withstanding normal plumbing pressure which will usually be about 40 or more pounds pressure. Local building and plumbing codes will set a safe minimum pressure. Within tubes 21 are perforated spiral tubing members 22, which also may be stainless steel, copper or other suitable material. This spiral tubing has spiral irregularities and a multiplicity of holes 24 for easy flow of water through tubing 22 so water can easily move into or out of tubes 21 to permit mixing of the water within tubes 22 and outside tubes 22. As water flows through spiral tubing members 22 mixing or agitation is set up, with the result that localized hot spots are mixed in to provide water of uniform temperature, and the act of drawing water from pipe assembly 14 provides such mixing.

As shown in further detail in FIG. 4, at each end of pipe assembly 14 is a mechanically fastened end plug 24 which seals off each of the pipe assemblies 14. This end plug is tightly fitted to outer tube 21 and resistant to normal pressures of household plumbing, and can be forced outwardly by extreme pressure, as for example by freezing of water in the pipe assemblies 14. Fitted into the end plugs are input tubes 16 at one end of each pipe assembly 14 and output tubes 18 at the opposite ends. As shown in FIG. 1, the input tubes 16 connect to a single input line 17 which leads out of frame 11 and is connected to the building's water supply, and the output tubes are connected to a single output line 19 which leads out of the frame to the building's hot water system. If more than one unit 10 is installed in the building, as in the case of a large hot water usage, the several units may be connected together through their input and output lines or each unit may feed a separate part of the hot water system.

Across frame 11 a cover member 26 is fastened to close the frame opening and insulate the unit from outside colder air. This cover is a sheet material which is transparent to the sun's heating radiation and may be a glass plate or other transparent or translucent material. According to the preferred embodiment of the invention this cover member 26 is a sheet of fiberglass material stapled directly to the frame 11. Rubber stripping (not shown) may be fitted between the cover member 26 and the frame 11, or the seam between the frame 11 and the cover 26 may be otherwise weatherstripped. Similar stripping (not shown) may be fitted beneath frame 10, between frame 10 and the roof.

End plugs have projecting rims 27 that fit between outer tubing 21 and inner spiral tubing 22, so that the plugs 26 serve several functions. First, they support the ends of inner tubing 21 within the outer tubing 21, and second they direct incoming water and outgoing water into and out of the inner spiral tubing. Referring now to FIG. 8, an inner tubing 22 is conventional spiral tubing formed from a sheet rolled in spiral form and having a spiral flange running along and around the tubing 28. As water flows through tubing 22, directed therethrough by inlet and outlet pipes 17 and 19, this spiral groove or flange causes the water to turn and mix in the inner spiral tubing. In addition, while mixing in this manner the water also passes through the holes to mix with the water outside inner tubing 22. Mixing in this manner is sufficient so that when hot water is used the temperature of the water in the unit 10 is quite uniform, both inside inner spiral tubing 22 and outside it and within outer tubing 21, and is sufficient to substantially eliminate or reduce layers of hotter water along the surface of outer tube 21 where the tube most directly faces the sun.

Figure 5:
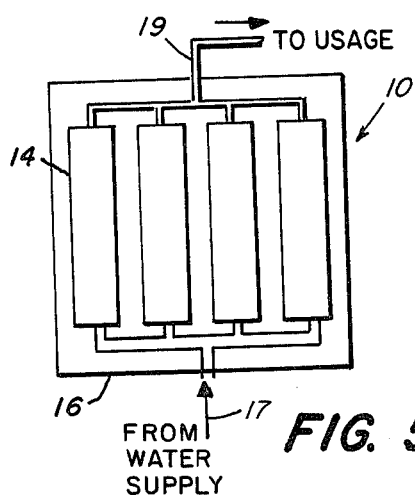
FIG. 5 is a schematic view of the unit of FIG. 1 connected to a home hot water system.

FIG. 5 illustrates schematically a basic unit 10 connected into a residential hot water system. In this basic system, the unit 10 is connected directly by means of inlet tube 17 to the water supply or plumbing input to a residence and is connected by means of output line 19 to the residential hot water usage. In the most simple form, as shown in FIG. 6, the unit 10 is installed directly on the roof of the residence, preferably on dark colored shingles or other roofing material 30. Frame 11 and cradles 12 are shown resting on shingles 30.

Figure 7:
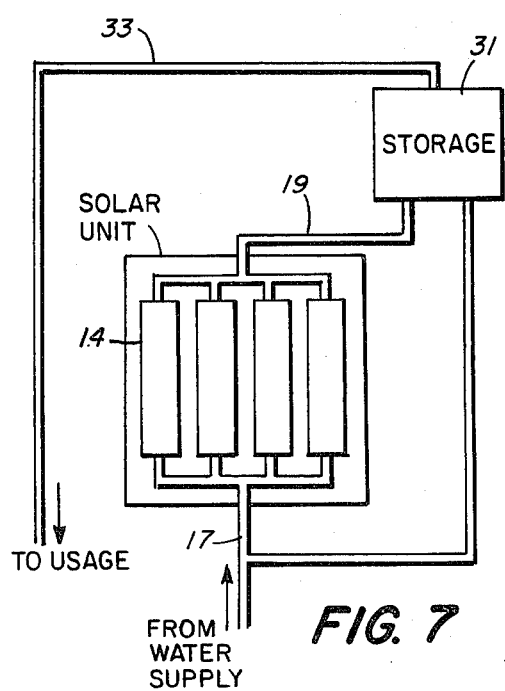
FIG. 7 is a schematic view of another installation connected to a home hot water system.

FIG. 7 illustrates a system according to another embodiment of the invention, including a solar unit 10 such as that illustrated in FIG. 1, and a hot water storage tank 31. Output line 19 leads from unit 10 to a tank 31 and a return line 32 from tank 31 joins inlet line 17 at a T. A usage line 33 feeds from tank 31 to the water usage system. In this system, if tank 31 is higher than unit 10 no pumps are needed to circulate water from the unit 10 to the tank 31.

In both the system of FIG. 5 and the system of FIG. 7 there is a drainage means such as a manually operated drain so that the hot water heating system may be drained in freezing weather.

In FIGS. 9 and 10 is shown another embodiment of the invention, this embodiment being intended preferably for new house construction. In this form, a house 35 or other building has built into its roof 36 a plurality of glass or other transparent or translucent panels 37 positioned between rafters 39. Cradles 40 are fastened between the rafters below the panels 37 to hold a plurality of pipe assemblies 14 beneath panels 37 where the sun's radiation can reach them. The ends of these pipe assemblies 14, as in FIG. 1, are connected to inlet and outlet lines 17 and 19 and thus to the water supply and the hot water usage.

As is seen from the Figures, the present solar hot water heating system is extremely simple in its construction and its operation. Conventional plumbing pipes and tubes are employed. The system is installed directly on the roof of a building for which hot water is supplied. The use of pumps and like mixing and water moving devices is obviated, inasmuch as the water is mixed as a consequence of its own motion through the system upon demand. No special radiation absorbers are employed provided there is a sunny roof area having a dark colored surface, and in the event that there is no such dark surface the roof at the installation area need only be painted a dark color.

The size and complexity of the system pedends on a number of factors such as the anticipated volume of hot water usage, the normal climate temperatures, and the relative number of sunny and partly sunny days. It has been found, however, that for a four-person family in a moderate and sunny climate, adequate hot water is supplied by the system shown in FIG. 1, employing four tube assemblies about seven feet long and made of about six or eight inch tubing. Generally, 4 inch or larger tubing is preferred and tubing up to 10 inches has been found adequate and satisfactory. If desired, smaller tubing or fins may be wrapped around either the inner or outer tubing to add strength and to assist in heat transfer. The materials used are non-corrosive and non-deleterious to drinking water, but the specific selection of materials may depend on local zoning or plumbing codes. Stainless steel is acceptable in some localities, copper clad steel in most localities, and copper and plastic tubing are acceptable in most. A preferred tubing material where it meets local codes is aluminum tubing within unit 10, with copper or plastic tubing for input and outlet lines. Cover 26 may be glass, but a less expensive material such as plastic or a fiberglass plate is preferred.

The solar hot water system of the present invention may be installed as the sole hot water heater in a residence or other building, but generally it is preferred to have a supplementary heater. With the availability of such supplementary heating, the unit 10, or the total capacity of two or several such units 10, should be about 80% of the hot water requirements on the coldest day or the day of maximum usage. While the system according to the present invention is much morre economical to build and install than typical solar hot water systems, it is desired to have the availability of alternate heating for prolonged periods of inadequate sunshine; optimum economy of installation and use results when the solar capacity is about 80% of maximum usage, whereas optimum economy of most systems is considered to be achieved when capacity is about 70% of maximum usage. The present invention is, in simple and direct terms, more economical.

I claim:

1. An economically useful solar hot water heating unit comprising at least one relatively large pipe assembly positioned at the roof of a building for which hot water is to be provided, support members supporting said pipe assembly in position, a frame surrounding said pipe assembly and including the adjacent portion of the roof and a cover member mounted to enclose said pipe assembly and to insulate said assembly from the surrounding atmosphere, each pipe assembly comprising an outer, pressure-sustaining tube and an inner perforated spiral tubing formed of sheet material in spiral configuration and having spiral agitating means comprising spiral-formed irregularities on the wall of said spiral tubing being adapted to mix water flowing therethrough by said spiral agitating means, said mixture being accomplished by interaction between the flow of water and said spiral agitating means, end caps mechanically fitted to said outer pressure sustaining tubes and means associated with said end caps for sealing said assembly and for supporting said spural tubing within said outer tubes, inlet conduit means from the water supply for said building to said pipe assembly to the hot water usage system of said building, and a light transmitting member positioned to transmit light from the sun to each pipe assembly, said light transmitting member being the upper one of said portion of the roof and said cover member.

2. A hot water system according to claim 1, having a hot water storage device positioned above the solar hot water heating unit, and conduit means leading to the storage device from an upper location in the unit and return conduit means leading from the storage device to a lower location in the unit, whereby water is heated and is mixed and stored by passive mixing means in the absence of active mixing means.

3. A low cost solar hot water heating unit comprising
an open frame adapted to be positioned directly on the roof of a building for which hot water is to be supplied, a cover member secured over and closing the upper opening of said frame, said cover being adapted to transmit sunlight, a plurality of support members within said frame and being adapted to rest on said roof, and at least one support member being positioned near an upper end of said frame and at least one support member being positioned near a lower end of said frame, a plurality of solar heating assemblies within said frame and supported on said support members, each of said solar heating assemblies comprising a water-tight, pressure-sustaining outer tube and an inner tube positioned therein, each of said inner tubes being perforated spiral tubing formed of sheet material in spiral configuration and having spiral agitating means therein, whereby flow of water therethrough produces rotational motion of said water with consequent mixing thereof by interaction between flowing water and said spiral agitating means, end sealing means sealing the ends of said outer tubing and associated therewith support means supporting said inner tubes within said outer tubes, and inlet conduit means connecting said assemblies to the water supply of said building and outlet conduit means connecting said assemblies to the water usage system of said building.

4. An economically useful hot water heating unit adapted for incorporation into new residential and like construction comprising a plurality of solar heating assemblies adapted to be mounted on the underside of the roof of a building, means to support said assemblies adjacent to said roof, a frame including cover members below said assemblies, wherein said frame, said roof and said cover members act to enclose and insulate said assemblies from the surrounding atmosphere, light transmitting panels adapted to be mounted in the roof above said assemblies, each of said assemblies comprising an outer water-tight, pressure-sustaining outer tube and an inner perforated spiral tubing formed from perforated sheet material in spiral configuration positioned therein, said inner tubing having spiral agitating means comprising spiral-formed irregularities on the wall of said spiral tubing adapted to cause rotational motion and consequential mixing of water passing therethrough solely by action between said water and said spiral agitating means, and end seal members mechanically sealing the ends of said outer tube and supporting said tubing, and inlet conduit means adapted to connect said assemblies to the water supply of said building and outlet conduit means adapted to connect said assemblies to the water usage system of said building.

* * * * *